United States Patent
Sato et al.

(10) Patent No.: US 12,531,087 B2
(45) Date of Patent: Jan. 20, 2026

(54) MAGNETIC RECORDING MEDIUM AND MAGNETIC STORAGE APPARATUS

(71) Applicant: Resonac Corporation, Tokyo (JP)

(72) Inventors: Yuki Sato, Chiba (JP); Takayuki Fukushima, Chiba (JP); Takeshi Sakamoto, Chiba (JP); Hisato Shibata, Tokyo (JP); Takehiro Yamaguchi, Chiba (JP); Masaru Tajima, Chiba (JP)

(73) Assignee: Resonac Hard Disk Corporation, Chiba (JP)

( * ) Notice: Subject to any disclaimer, the term of this patent is extended or adjusted under 35 U.S.C. 154(b) by 0 days.

(21) Appl. No.: 18/796,778

(22) Filed: Aug. 7, 2024

(65) Prior Publication Data
US 2025/0087238 A1    Mar. 13, 2025

(30) Foreign Application Priority Data

Sep. 13, 2023  (JP) .................................. 2023-148156

(51) Int. Cl.
*G11B 5/66* (2006.01)
*G11B 5/73* (2006.01)

(52) U.S. Cl.
CPC ............ *G11B 5/672* (2021.05); *G11B 5/7375* (2019.05)

(58) Field of Classification Search
CPC .............................. G11B 5/672; G11B 5/7375
See application file for complete search history.

(56) References Cited

U.S. PATENT DOCUMENTS 9,601,144 B1 *   3/2017   Mehta .................... G11B 5/676
2020/0005821 A1 *  1/2020   Zhang .................... G11B 5/82

OTHER PUBLICATIONS

Xu et al., Bias sputtering of granular L10-FePt films with hexagonal boron nitride grain boundaries, Scientific Reports 13:11087, pp. 1-10 (Year: 2023).*
Xu et al., Single Crystalline Film of Hexagonal Boron Nitride Atomic Monolayer by Controlling Nucleation Seeds and Domains, Scientific Repots 5:16159, pp. 1-8 (Year: 2015).*
B. S. D. Ch. S. Varaprasad et al., "FePt-BN granular HAMR media with high grain aspect ratio and high L1 ordering on corning LotusTM NXT glass", AIP Advances, 13, 035002 (2023).

* cited by examiner

*Primary Examiner* — Holly Rickman
*Assistant Examiner* — Linda N Chau
(74) *Attorney, Agent, or Firm* — IPUSA, PLLC (57) ABSTRACT

A magnetic recording medium includes a nonmagnetic substrate, an underlayer disposed above the nonmagnetic substrate, and a magnetic recording layer disposed above the underlayer. The magnetic recording layer includes a first magnetic layer disposed above the underlayer, and a second magnetic layer disposed above the first magnetic layer. Each of the first magnetic layer and the second magnetic layer has a granular structure including magnetic grains having a $L1_0$ structure and a grain boundary portion. The grain boundary portion of the first magnetic layer includes aluminum nitride, and the grain boundary portion of the second magnetic layer includes hexagonal boron nitride. An aluminum nitride content in the first magnetic layer is in a range of 15 vol % to 35 vol %, and a peak in a B1s spectrum of the grain boundary portion of the second magnetic layer observed using X-ray photoelectron spectroscopy is 191.6 eV or less.

9 Claims, 3 Drawing Sheets

MAGNETIC RECORDING MEDIUM AND MAGNETIC STORAGE APPARATUS

CROSS-REFERENCE TO RELATED APPLICATIONS

This application is based upon and claims priority to Japanese Patent Application No. 2023-148156, filed on Sep. 13, 2023, the entire contents of which are incorporated herein by reference.

FIELD

Certain aspects of the embodiments discussed herein are related to magnetic recording media and magnetic storage apparatuses.

BACKGROUND

Heat assisted recording systems or microwave assisted recording systems perform recording at a reduced coercivity by locally heating a magnetic recording medium by irradiating near-field light or microwave. Such heat assisted recording systems (or thermal assist recording systems) and microwave assisted recording systems are being considered as the next-generation recording systems capable of achieving high surface recording densities on the order of 2 Tbit/inch$^2$. When a magnetic head of the heat or microwave assisted recording system is used, recording can easily be performed on a magnetic recording medium having a coercivity of several tens of kOe at room temperature. For this reason, magnetic grains having a high magnetocrystalline anisotropy constant (Ku) can be used for magnetic grains included in a magnetic layer of the magnetic recording medium, and as a result, the magnetic grains having the high magnetocrystalline anisotropy constant (Ku) can be miniaturized while maintaining thermal stability.

As described above, the magnetic grains having the high magnetocrystalline anisotropy constant (Ku) can be used for the magnetic grains included in the magnetic layer of the magnetic recording medium for the heat or microwave assisted recording system. The magnetic grains having the high magnetocrystalline anisotropy constant (Ku) can be miniaturized while maintaining the thermal stability, and the coercivity at room temperature can be increased.

Known magnetic grains having the high magnetocrystalline anisotropy constant (Ku) include magnetic grains having a $L1_0$ structure, such as FePt alloy grains with a magnetocrystalline anisotropy constant Ku of $7\times10^6$ J/m$^3$ at a maximum, CoPt alloy grains with a magnetocrystalline anisotropy constant Ku of $5\times10^6$ J/m$^3$ at a maximum, or the like, for example.

As the magnetic layer using the magnetic grains having the $L1_0$ structure, B. S. D. Ch. S. Varaprasad et al., "FePt—BN granular HAMR media with high grain aspect ratio and high L1 ordering on corning Lotus™ NXT glass", AIP Advances, 13, 035002 (2023) proposes a magnetic layer having a granular structure in which peripheries of FePt magnetic grains having the $L1_0$ structure are covered with a layered material of hexagonal boron nitride, for example.

It is desirable to further improve a surface recording density of the magnetic recording medium. In order to further improve the surface recording density of the magnetic recording medium, it is important to further reduce a grain diameter of the magnetic grains included in the magnetic layer and to further increase the anisotropy of the magnetic grains.

As the magnetic layer including the magnetic grains having such properties, there is a proposed magnetic layer having a granular structure including FePt magnetic grains with a $L1_0$ structure and oriented in the (001) direction, and hexagonal boron nitride (hBN) at a grain boundary portion. This proposed magnetic layer is hereinafter also referred to as "a FePt-hBN granular magnetic layer".

Hexagonal boron nitride has a layered structure in which (001) planes are laminated in parallel, but because a grain boundary portion is easily formed to surround a side surface of the FePt magnetic grain, it is possible to reduce a grain diameter (or a grain size) of the FePt magnetic grains. In addition, because the hexagonal boron nitride has a low reactivity with the FePt magnetic grains, the hexagonal boron nitride does not inhibit ordering of the magnetic grains.

However, it is difficult to stably form such an FePt-hBN granular magnetic layer by a conventional method. That is, the FePt-hBN granular magnetic layer is formed by sputtering or the like, for example, and a high substrate temperature and a plasma space with a high energy density are required to make the boron nitride a hexagonal crystal. As a result of diligent studies, the present inventors found that when the magnetic layer is exposed to a high energy environment required for the hexagonal crystallization, oxygen atoms included in the underlayer or the substrate are diffused into the FePt-hBN granular magnetic layer. The diffused oxygen atoms cause coarsening of the FePt grains and deterioration of static magnetic properties, such as a saturation magnetization Ms or the like, and as a result, cause deterioration of electromagnetic conversion characteristics, particularly a surface recording density, of the magnetic recording medium.

SUMMARY

Accordingly, it is an object in one aspect of the present disclosure is to provide a magnetic recording medium in which diffusion of oxygen atoms into a magnetic layer is prevented, to reduce a grain size of magnetic grains included in the magnetic recording layer, increase a saturation magnetization, and further improve a surface recording density of the magnetic recording medium.

According to one aspect of the embodiments, a magnetic recording medium includes a nonmagnetic substrate; an underlayer disposed above the nonmagnetic substrate; and a magnetic recording layer disposed above the underlayer, wherein the magnetic recording layer includes a first magnetic layer disposed above the underlayer, and a second magnetic layer disposed above the first magnetic layer, each of the first magnetic layer and the second magnetic layer has a granular structure including magnetic grains having a $L1_0$ structure and a grain boundary portion, the grain boundary portion of the first magnetic layer includes aluminum nitride, the grain boundary portion of the second magnetic layer includes hexagonal boron nitride, an aluminum nitride content in the first magnetic layer is in a range of 15 vol % to 35 vol %, and a peak in a B1s spectrum of the grain boundary portion of the second magnetic layer observed using X-ray photoelectron spectroscopy is 191.6 eV or less.

The object and advantages of the embodiments will be realized and attained by means of the elements and combinations particularly pointed out in the claims.

It is to be understood that both the foregoing general description and the following detailed description are exemplary and explanatory and not restrictive of the invention, as claimed.

DESCRIPTION OF EMBODIMENTS

[1] A magnetic recording medium according to one embodiment of the present disclosure includes a nonmagnetic substrate; an underlayer disposed above the nonmagnetic substrate; and a magnetic recording layer disposed above the underlayer, wherein the magnetic recording layer includes a first magnetic layer disposed above the underlayer, and a second magnetic layer disposed above the first magnetic layer, each of the first magnetic layer and the second magnetic layer has a granular structure including magnetic grains having a $L1_0$ structure and a grain boundary portion, the grain boundary portion of the first magnetic layer includes aluminum nitride, the grain boundary portion of the second magnetic layer includes hexagonal boron nitride, an aluminum nitride content in the first magnetic layer is in a range of 15 vol % to 35 vol %, and a peak in a B1s spectrum of the grain boundary portion of the second magnetic layer observed using X-ray photoelectron spectroscopy is 191.6 eV or less.

[2] In the magnetic recording medium according to [1] above, the first magnetic layer may have a thickness in a range of 0.25 nm to 0.7 nm.

[3] In the magnetic recording medium according to [1] or [2] above, the second magnetic layer may have a thickness in a range of 5 nm to 12 nm.

[4] In the magnetic recording medium according to any of [1] to [3] above, the magnetic grains having the $L1_0$ structure may be FePt alloy grains.

[5] A magnetic storage apparatus according to one embodiment of the present disclosure includes the magnetic recording medium according to any one of [1] to [4] above; and a head configured to record information on and reproduce information from the magnetic recording medium.

Hereinafter, embodiments of the present invention will be described with reference to the drawings. For the sake of convenience, in the drawings used in the following description, characterizing portions may be enlarged and illustrated, for example, in order to facilitate the understanding of the characterizing portions. In other words, the drawings are not drawn to scale, and dimensional ratios or the like of constituent elements are not necessarily the same in each drawing and among the drawings. In addition, in the present specification, "a range of A to B", indicating a numerical range, includes a value "A" as a lower limit value of the range and a value "B" as an upper limit value of the range, unless indicated otherwise.

[Magnetic Recording Medium]

Figure 1:
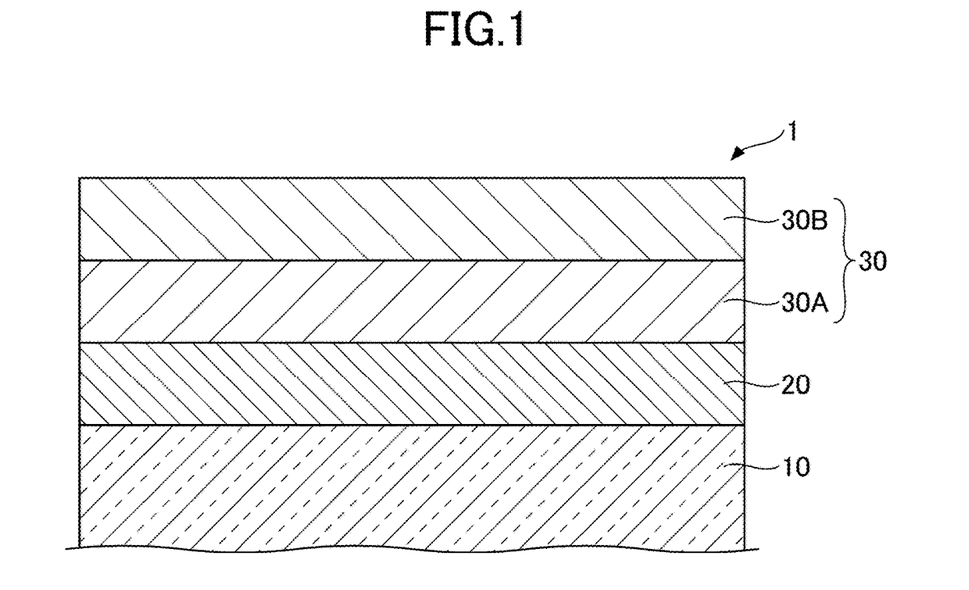
FIG. 1 is a cross sectional view illustrating an example of a layer configuration of a magnetic recording medium according to one embodiment of the present invention.

FIG. 1 illustrates an example of a layer structure of a magnetic recording medium according to one embodiment of the present invention.

As illustrated in FIG. 1, a magnetic recording medium 1 includes an underlayer 20, a first magnetic layer 30A, and a second magnetic layer 30B that are successively disposed on a nonmagnetic substrate 10. The first magnetic layer 30A and the second magnetic layer 30B have a granular structure including magnetic grains having a $L1_0$ structure and a grain boundary portion. The grain boundary portion of the first magnetic layer 30A includes aluminum nitride. The grain boundary portion of the second magnetic layer 30B includes hexagonal boron nitride. An aluminum nitride content in the first magnetic layer 30A is in a range of 10 volume percent (vol %) to 45 vol %. A peak in a B1s spectrum of the grain boundary portion of the second magnetic layer observed using X-ray photoelectron spectroscopy (XPS) is 191.6 eV or less.

By adopting such a configuration, it is possible to prevent coarsening of the magnetic grains, and to prevent deterioration of magnetic properties of the magnetic recording medium, particularly a saturation magnetization Ms.

Examples of the magnetic grains having a $L1_0$ structure and forming each of the first magnetic layer 30A and the second magnetic layer 30B include FePt alloy grains, and CoPt alloy grains, or the like, for example. The FePt alloy grains are preferably used for each of the first magnetic layer 30A and the second magnetic layer 30B.

In addition, the magnetic grains included in each of the first magnetic layer 30A and the second magnetic layer 30B are preferably c-axis oriented, that is, configured to enhance a (001) plane orientation with respect to the nonmagnetic substrate 10. Each of the first magnetic layer 30A and the second magnetic layer 30B is preferably formed by sputtering.

Examples of a method of causing a c-axis orientation of the magnetic grains included in the second magnetic layer 30B with respect to the nonmagnetic substrate 10 include a method of epitaxially growing the magnetic layer in the c-axis direction using the underlayer 20, or the like, for example.

An aluminum nitride content in the grain boundary portion of the first magnetic layer 30A is in a range of 15 vol % to 35 vol %. The aluminum nitride content is preferably 15 vol % or more, and more preferably 20 vol % or more. The aluminum nitride content is preferably 35 vol % or less, and more preferably 25 vol % or less.

As described above, in order to form a granular magnetic layer including hexagonal boron nitride in the grain boundary portion, a high substrate temperature and a plasma space having a high energy density are required. Under such conditions, diffusion of oxygen atoms included in the underlayer or the substrate into the second magnetic layer 30B progresses. As a result, the magnetic grains are coarsened, and the saturation magnetization Ms is greatly reduced. Accordingly, in the present embodiment, the first magnetic layer 30A is provided between the underlayer 20 and the second magnetic layer 30B, and aluminum nitride is included in the grain boundary portion of the first magnetic layer 30A, so as to prevent the diffusion of the oxygen atoms into the second magnetic layer 30B.

That is, an absolute value of a Gibbs free energy of oxidation reaction for aluminum is larger than those for B, Fe, and Pt included in the first magnetic layer 30A and the second magnetic layer 30B. In addition, aluminum is more easily oxidized than B, Fe, and Pt included in the first magnetic layer 30A and the second magnetic layer 30B. For this reason, aluminum efficiently reacts with the oxygen that diffuses from the nonmagnetic substrate 10 or the underlayer 20, and thus, the oxygen is prevented from diffusing into the second magnetic layer 30B.

Accordingly, the aluminum nitride included in the grain boundary portion of the first magnetic layer 30A captures the oxide described above, as expressed by a composition ratio of $AlN_xO_{1-x}$, for example.

According to studies conducted by the present inventors, when the aluminum nitride content in the first magnetic layer 30A is in a range of 10 vol % to 30 vol %, approximately 30 atomic percent (at %) (x=0.7) of the aluminum nitride is consumed for the capturing of the oxygen. It may be regarded that the oxide captured by the aluminum nitride is captured as $Al_2O_3$, AlON, amorphous, or the like in the grain boundary portion of the first magnetic layer 30A.

The grain boundary portion of the first magnetic layer 30A may include BN, C, $SiO_2$, or the like in addition to the aluminum nitride. In this case, the grain boundary portion of the first magnetic layer 30A is preferably in a range of 25 vol % to 50 vol %.

An oxidation state of boron nitride included in the grain boundary portion of the second magnetic layer 30B can be estimated from a peak position in a B1s spectrum observed by X-ray photoelectron spectrometry (XPS). The peak position in the B1s spectrum observed by the XPS is a peak top of the XPS spectrum derived from B1s electrons of boron included in the magnetic layer, and reflects a chemical state of the boron included in the magnetic layer. In a case where the peak is 191.6 eV or less, the oxidation of the boron nitride is reduced to approximately 30% or less, and thus, the coarsening of the magnetic grains of the second magnetic layer 30B and the deterioration of electromagnetic conversion characteristics of the magnetic recording medium can be prevented. When the peak in the B1s spectrum reaches 192.0 eV, the oxidation of the boron nitride becomes approximately 50%, and the coarsening of the magnetic grains in the second magnetic layer 30B and the deterioration of the electromagnetic conversion characteristics of the magnetic recording medium become notable.

The nonmagnetic substrate 10 may be a substrate generally used for the magnetic recording medium 1. Because the nonmagnetic substrate 10 may be heated to a temperature of 500° C. or higher when manufacturing the magnetic recording medium 1, a heat-resistant glass substrate having a softening temperature of 500° C. or higher, and preferably 600° C. or higher, for example, is preferably used as the nonmagnetic substrate 10. When the softening temperature of the nonmagnetic substrate 10 is 500° C. or higher, the diffusion of the oxygen atoms from the nonmagnetic substrate 10 to the first magnetic layer 30A and the second magnetic layer 30B can be effectively prevented, and a degree of freedom or design of the nonmagnetic substrate 10 can be increased.

A material forming the underlayer 20 is not particularly limited as long as the magnetic grains having the $L1_0$ structure, included in the first magnetic layer 30A and the second magnetic layer 30B, can be oriented to have the (001) plane orientation.

The underlayer 20 may have a multilayer structure (or multi-layered structure).

The underlayer 20 preferably includes a NaCl type compound.

Examples of the NaCl type compound include MgO, TiO, NiO, TiN, TaN, HEN, NbN, ZrC, HfC, TaC, NbC, TiC, or the like, for example. One of such NaCl type compounds or a combination of two or more of such NaCl type compounds may be used for the underlayer 20.

Among the NaCl type compounds, particularly MgO having a (100) plane orientation is preferably used as the material forming the underlayer 20. MgO having the (100) plane orientation has a high lattice matching with $L1_0$ alloys, such as FePt or the like, and is more preferably introduced to an uppermost surface of the underlayer 20. In the present embodiment, because the diffusion of the oxygen atoms from the underlayer 20 to the first magnetic layer 30A and the second magnetic layer 30B is effectively prevented, a degree of freedom of design of the underlayer 20 can be increased.

The magnetic recording medium 1 preferably further includes a protective layer disposed on the second magnetic layer 30B.

Examples of the protective layer include a hard carbon film or the like, for example.

Examples of the method of forming the protective layer include radio frequency-chemical vapor deposition (RF-CVD) which decomposes a hydrocarbon gas (source gas) by high-frequency plasma to form a film, ion beam deposition (IBD) which ionizes a source gas by electrons emitted from a filament to form a film, a filtered cathodic vacuum arc (FCVA) which forms a film using a solid carbon target without using a source gas, or the like, for example.

The protective layer preferably has a thickness in a range of 1.0 nm to 6.0 nm. When the thickness of the protective layer is 1.0 nm or more, levitation characteristics of a magnetic head improve. On the other hand, when the thickness of the protective layer is 6.0 nm or less, a magnetic spacing decreases, and a signal-to-noise ratio (S/N ratio, or SNR) of the magnetic recording medium 1 improves.

The magnetic recording medium 1 may further include a lubricant layer disposed on the protective layer.

The lubricant layer can be formed using a liquid lubricant layer. Preferably, the liquid lubricant is chemically stable, and has a low friction and a low adsorption. Examples of the liquid lubricant include fluororesin-based lubricants, such as perfluoropolyether-based lubricants including a compound having a perfluoropolyether structure, or the like, for example.

A thickness of the lubricant layer is not particularly limited, and may be in a range of 1 nm to 3 nm, for example.

The magnetic recording medium 1 may include an appropriate and arbitrary layer in addition to the protective layer and the lubricant layer. For example, the magnetic recording medium 1 may include an adhesion layer, a soft magnetic underlayer, an orientation control layer, or the like between any two among the nonmagnetic substrate 10, the underlayer 20, and the first magnetic layer 30A, as appropriate. The soft magnetic underlayer may include a first soft magnetic layer, an intermediate layer, and a second soft magnetic layer, for example. The orientation control layer may be a single layer, or may be two or more layers including a first orientation control layer, a second orientation control layer, or the like. Materials used for the adhesion layer, the soft magnetic underlayer, the orientation control layer, or the like may be materials generally used for magnetic recording media.

Accordingly, the magnetic recording medium 1 includes the nonmagnetic substrate 10, the underlayer 20, the first magnetic layer 30A, and the second magnetic layer 30B in this order. Each of the first magnetic layer 30A and the second magnetic layer 30B has the granular structure including the magnetic grains having the $L1_0$ structure and the grain boundary portion. The grain boundary portion of the first magnetic layer 30A includes aluminum nitride, and the grain boundary portion of the second magnetic layer 30B includes hexagonal boron nitride. The magnetic recording medium 1 having the configuration described above can reduce the grain size of the magnetic grains included in the second magnetic layer 30B, increase the saturation magnetization Ms, and further improve the electromagnetic conversion characteristics and the surface recording density.

Because the magnetic recording medium 1 has the characteristics described above, even when the heat assisted recording system or the microwave assisted recording system is used for the recording system, information can be sufficiently and magnetically recorded in the first magnetic layer 30A and the second magnetic layer 30B by a recording magnetic field of the magnetic head due to the high recording density of the first magnetic layer 30A and the second magnetic layer 30B. For this reason, the magnetic recording medium 1 can be suitably used in a magnetic storage apparatus having an even higher recording capacity (or higher storage capacity).

[Magnetic Storage Apparatus]

Next, a magnetic storage apparatus using the magnetic recording medium according to the present embodiment will be described. The magnetic storage apparatus according to the present embodiment is not particularly limited to a specific type, as long as the magnetic recording medium according to the present embodiment is included therein. Hereinafter, an example in which information is magnetically recorded on the magnetic recording medium by the magnetic storage apparatus using the heat assisted recording system will be described.

For example, the magnetic storage apparatus according to the present embodiment includes a driving mechanism which drives the magnetic recording medium to rotate in a recording direction, and a heat assisted magnetic head having a near-field light generator (or near-field light generating element) provided on a tip end thereof. The magnetic storage apparatus further includes a head moving mechanism which moves the heat assisted magnetic head, and a signal processor which processes signals input to the heat assisted magnetic head to be recorded on the magnetic recording medium, and processes signals reproduced from the magnetic recording medium by the heat assisted magnetic head and output from the heat assisted magnetic head.

The heat assisted magnetic head further has a laser generator which generates laser light for heating the magnetic recording medium, and a waveguide which guides the laser light generated from the laser generator to the near-field light generator.

Figure 2:
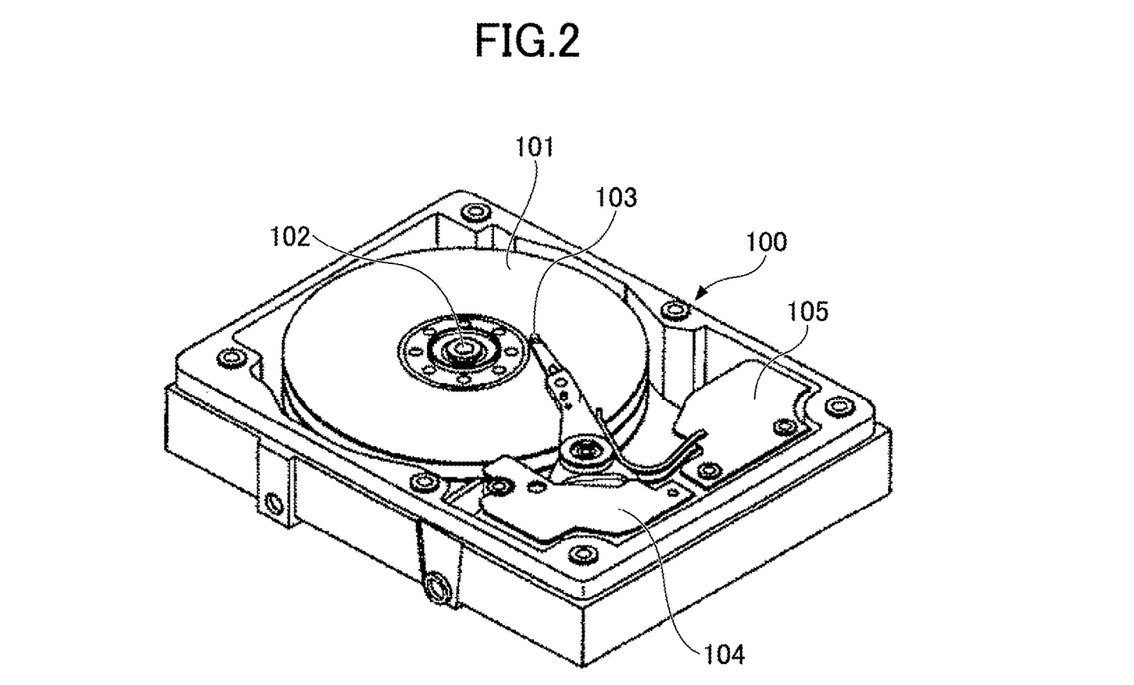
FIG. 2 is a perspective view illustrating an example of a magnetic storage apparatus according to one embodiment of the present invention.

FIG. 2 is a perspective view illustrating an example of a magnetic storage apparatus using the magnetic recording medium according to the present embodiment. As illustrated in FIG. 2, a magnetic storage apparatus 100 includes one more magnetic recording media 101, a driving mechanism 102 which drives the one or more magnetic recording media 101 to rotate, a heat assisted magnetic head 103 having a near-field light generator (or near-field light generating element) provided on a tip end thereof, a head moving mechanism 104 which moves the heat assisted magnetic head 103, and a signal processor 105. The signal processor 105 processes signals which are input to the heat assisted magnetic head 103 to be recorded on the magnetic recording medium 101, and processes signals which are reproduced from the magnetic recording medium 101 by the heat assisted magnetic head 103 and output from the heat assisted magnetic head 103. The magnetic recording medium 1 illustrated in FIG. 1 may be used as the magnetic recording medium 101. For example, the magnetic recording medium 101 may have a disk shape, and in this case, the magnetic storage apparatus may form a Hard Disk Drive (HDD).

Figure 3:
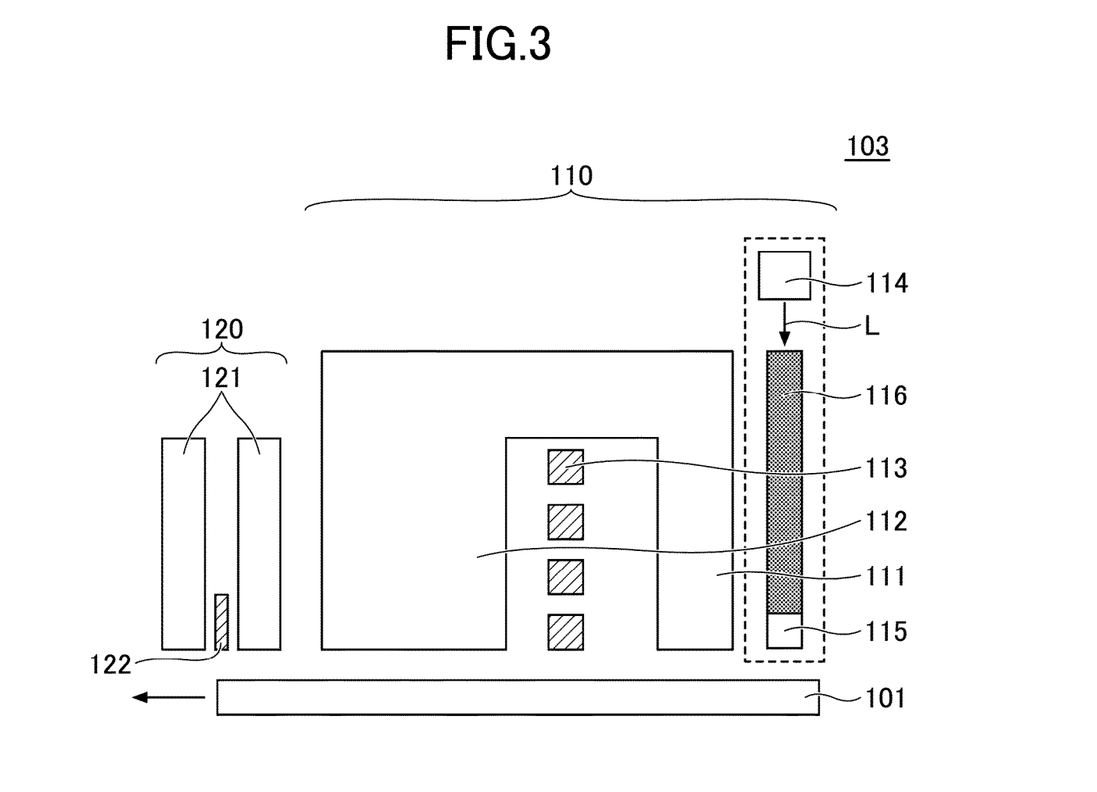
FIG. 3 is a schematic diagram illustrating a magnetic head in FIG. 2.

FIG. 3 is a schematic diagram illustrating an example of the heat assisted magnetic head 103 illustrated in FIG. 2. The heat assisted magnetic head 103 illustrated in FIG. 3 includes a recording (or write) head 110 which records (or writes) signals to the magnetic recording medium 101, and a reproducing (or read) head 120 which reproduces (or reads) signals from the magnetic recording medium 101.

The recording head 110 includes a main magnetic pole 111, an auxiliary magnetic pole 112, a coil 113 which generates a magnetic field, a laser diode (LD) 114 which is an example of the laser generator and generates laser light L, a near-field light generator (or near-field light generating element) 115 which generates near-field light for heating the magnetic recording medium 101, and a waveguide 116. The waveguide 116 guides the laser light L generated from the laser diode 114 to the near-field light generator 115 which is provided on a tip end of the heat assisted magnetic head 103.

The reproducing head 120 includes a reproducing element 122, such as a TMR (Tunneling Magneto-Resistive) element or the like, for example, that is disposed between a pair of shields 121.

As illustrated in FIG. 2, in the magnetic storage apparatus 100, a central portion of the magnetic recording medium 101 is attached to a rotating shaft of a spindle motor, and records information on and reproduces information from the magnetic recording medium 101 in a state where the heat assisted magnetic head 103 moves while floating above a surface of the magnetic recording medium 101 which is driven to rotate by the spindle motor.

The magnetic storage apparatus 100 according to the present embodiment can increase the recording capacity, because it is possible to increase the surface recording density of the magnetic recording medium 101 by using the magnetic recording medium 1 according to the present embodiment as the magnetic recording medium 101.

Of course, the magnetic storage apparatus 100 may use a microwave assisted magnetic head which conforms to the microwave assisted recording system in place of the heat assisted magnetic head 103 which conforms to the heat assisted recording system.

Although embodiments are described above, the embodiments are presented as examples, and the present invention is not limited to these embodiments. The embodiments described above can be implemented in various other forms, and various combinations, omissions, substitutions, variations, modifications, or the like can be made without departing from the scope and spirit of the present invention. These embodiments and modifications thereof are included in the scope and spirit of the present invention, and are included in the present invention described in the claims and the scope of equivalents thereof.

[Exemplary Implementations]

Hereinafter, embodiments will be described more specifically with reference to exemplary implementations and comparative examples, but the embodiments are not limited to these exemplary implementations and comparative examples.

<Manufacturing Magnetic Recording Medium>

(Exemplary Implementation EI1)

A Co-27 at % Fe-5 at % Zr-5 at % B alloy layer having a thickness of 30 nm, and a Cr-50 at % Ti alloy layer having a thickness of 100 nm, were successively formed on a glass substrate by sputtering, as the underlayer. Next, after heating the glass substrate to 250° C., a Cr layer having a thickness of 10 nm, and a MgO layer having a thickness of 5 nm, were also successively formed by sputtering, as the underlayer. Then, after heating the glass substrate to 450° C., a FePt-20 vol % AlN-8 vol % C-6 vol % BN alloy layer having a thickness of 0.25 nm was formed by sputtering, as the first magnetic layer 30A. Thereafter, a FePt-38 vol % BN alloy layer having a thickness of 6 nm was formed by sputtering, as the second magnetic layer 30B. In order to crystallize the BN, a high-frequency bias of 7 W was applied to the substrate when forming the second magnetic layer 30B. Next, a carbon film having a thickness of 3 nm was formed as a protective layer, thereby forming the magnetic recording medium according to the exemplary implementation EI1.

(Exemplary Implementations EI2 to EI11, and Comparative Examples Cmp1 to Cmp11)

Magnetic recording media according to exemplary implementations EI2 to EI11 and comparative examples Cmp1 to Cmp11 were manufactured in a manner similar to the exemplary implementation EI1, except for the conditions under which the first magnetic layer 30A and the second magnetic layer 30B were formed, which are illustrated in Table 1.

Table 1 illustrates the composition and thickness of the first magnetic layer 30A, the composition and thickness of the second magnetic layer 30B, and the high-frequency bias applied to the substrate when forming the second magnetic layer 30B, for each of the exemplary implementations EI1 to EI11 and the comparative examples Cmp1 to Cmp11.

<Evaluation of Magnetic Recording Medium>

A peak position in the B1s spectrum of the second magnetic layer 30B observed by XPS, an intergrain distance of the magnetic grains included in the second magnetic layer 30B, and the saturation magnetization Ms were measured for each of the magnetic recording media manufactured according to the exemplary implementations EI1 to EI11 and the comparative examples Cmp1 to Cmp11. The measured results are illustrated in Table 1.

(Measurement of Peak Position in B1s Spectrum of Second Magnetic Layer Observed by XPS)

Figure 4:
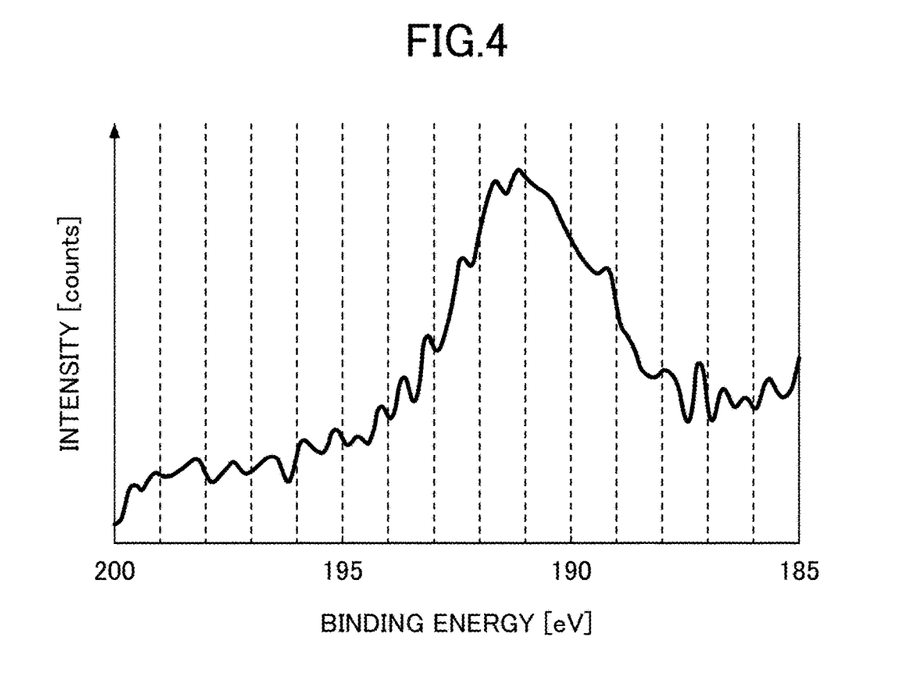
FIG. 4 is a diagram illustrating a B1s spectrum of a second magnetic layer observed using X-ray photoelectron spectroscopy (XPS) for an exemplary implementation EI4.
Figure 5:
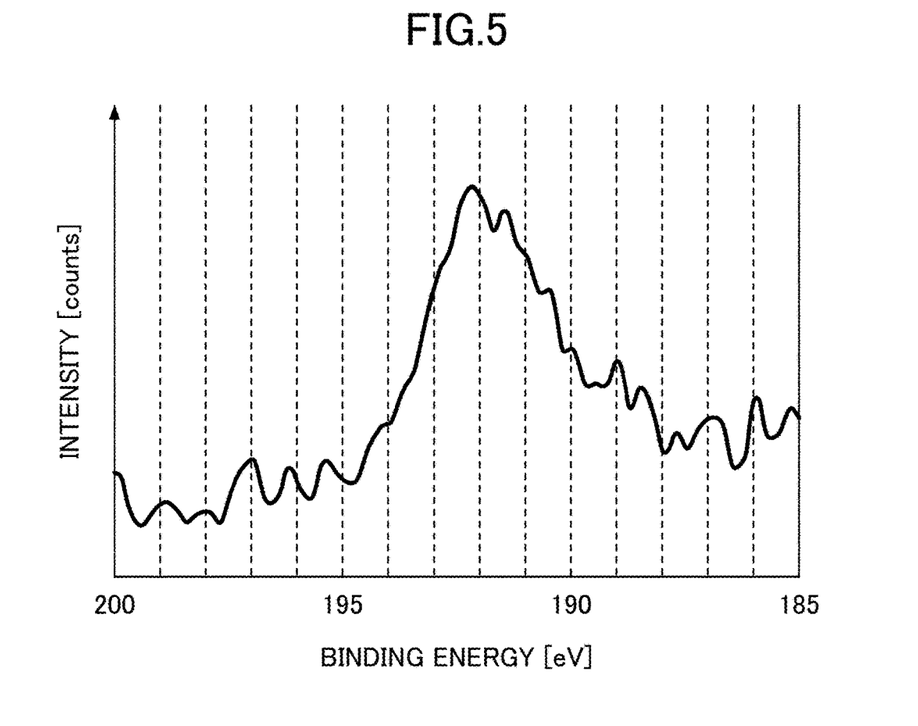
FIG. 5 is a diagram illustrating the B1s spectrum of the second magnetic layer observed using the XPS for a comparison example Cmp7.

The surface of the magnetic recording medium was subjected to argon etching for 1 minute to remove the carbon protective film on the surface of the magnetic recording medium. Thereafter, the XPS measurement of the second magnetic layer 30B was performed under the following XPS measurement conditions, the B1s spectrum of the second magnetic layer 30B observed by the XPS was measured, and a binding energy at the peak position of the B1s spectrum was measured. A chemical state of BN included in the grain boundary portion of the second magnetic layer 30B was evaluated from the binding energy at the peak position in the measured B1s spectrum. The measured results of the B1s spectrum of the second magnetic layer 30B observed by the XPS for the exemplary implementation EI4 and the comparative example Cmp7 are illustrated in FIG. 4 and FIG. 5, respectively.

(XPS Measurement Conditions)

Measuring Apparatus: X-ray photoelectron spectrometer Quantera SXM (manufactured by ULVAC-PHI, Incorporated)

X-ray source: AlKα line (1486.6 eV)

X-ray power: 25 W, 15 kV

Detection region: 100 μmφ (μm in diameter)

Detection location: Surface of second magnetic layer 30B

Detection depth: 3 nm (angle of extraction: 45°)

Measured spectrum: B1s (Intergrain Distance of Magnetic Grains Included in Second Magnetic Layer)

The value of an intergrain center distance computed from a surface observation image obtained by a scanning electron microscope TEM HD-2300 (manufactured by Hitachi High-Tech Corporation) was measured as the intergrain distance of the magnetic grains included in the second magnetic layer 30B. The intergrain center distance of the magnetic grains refers to a distance between centers of gravity of adjacent magnetic grains. It can be evaluated that, the smaller the intergrain distance is, the smaller the grain diameter of the magnetic grains becomes.

(Saturation Magnetization Ms of Magnetic Recording Medium)

The saturation magnetization Ms of the magnetic recording medium was computed using a SQUID-VSM magnetometer MPMS (manufactured by Quantum Design). The saturation magnetization of the first magnetic layer 30A and the second magnetic layer 30B was measured, and the saturation magnetization of a soft magnetic underlayer or the like was not included.

TABLE 1

| | 1st Magnetic layer 30A | | 2nd Magnetic layer 30B | | Bias [W] when forming 2nd magnetic layer | Magnetic recording medium | | |
|---|---|---|---|---|---|---|---|---|
| | | | | | | Peak position [eV] of B1s spectrum of 2nd magnetic layer observed using XPS | Intergrain distance [nm] of magnetic grains included in 2nd magnetic layer | Saturation magnetization Ms [emu/cm³] |
| | Composition (magnetic grain/ grain boundary) | Thickness [nm] | Composition (magnetic grain/ grain boundary) | Thickness [nm] | | | | |
| EI1 | FePt/8C—6BN—20AlN | 0.25 | FePt/38BN | 6.0 | 7 | 191.6 | 7.03 | 762.2 |
| EI2 | FePt/20AlN | 0.67 | FePt/38BN | 4.0 | 7 | 190.7 | 7.40 | 751.7 |
| EI3 | FePt/8C—6BN—20AlN | 0.50 | FePt/38BN | 4.0 | 7 | 191.0 | 7.39 | 772.6 |
| EI4 | FePt/8C—6BN—20AlN | 0.25 | FePt/38BN | 4.0 | 7 | 191.6 | 7.15 | 706.8 |
| EI5 | FePt/8C—6BN—20AlN | 0.50 | FePt/38BN | 4.0 | 10 | 191.2 | 7.50 | 751.9 |
| EI6 | FePt/8C—6BN—20AlN | 0.25 | FePt/38BN | 4.0 | 10 | 190.7 | 7.31 | 702.2 |
| EI7 | FePt/5C—8BN—25AlN | 0.50 | FePt/38BN | 4.0 | 7 | 191.0 | 7.93 | 727.0 |
| EI8 | FePt/8C—6BN—20AlN | 0.50 | FePt/38BN | 6.0 | 7 | 190.9 | 6.83 | 891.5 |
| EI9 | FePt/8C—6BN—20AlN | 0.75 | FePt/38BN | 4.0 | 10 | 191.0 | 8.39 | 732.5 |
| EI10 | FePt/20AlN | 1.00 | FePt/38BN | 4.0 | 7 | 190.7 | 8.57 | 742.8 |
| EI11 | FePt/35AlN | 0.50 | FePt/38BN | 4.0 | 7 | 190.6 | 7.83 | 688.7 |
| Cmp1 | FePt/8C—6BN—20AlN | 0.50 | FePt/38BN | 4.0 | 20 | 192.0 | 8.53 | 639.1 |
| Cmp2 | FePt/8C—6BN—20AlN | 0.50 | FePt/38BN | 4.0 | 70 | 192.2 | 9.09 | 58.1 |

TABLE 1-continued

|  | 1st Magnetic layer 30A | | 2nd Magnetic layer 30B | | Bias [W] when forming 2nd magnetic layer | Magnetic recording medium | | |
|---|---|---|---|---|---|---|---|---|
|  | Composition (magnetic grain/ grain boundary) | Thick- ness [nm] | Composition (magnetic grain/ grain boundary) | Thick- ness [nm] |  | Peak position [eV] of B1s spectrum of 2nd magnetic layer observed using XPS | Intergrain distance [nm] of magnetic grains included in 2nd magnetic layer | Satu- ration magneti- zation Ms [emu/cm$^3$] |
| Cmp3 | None | 0.00 | FePt/38BN | 4.0 | 20 | 192.0 | 9.44 | 710.7 |
| Cmp4 | None | 0.00 | FePt/38BN | 4.0 | 70 | 192.0 | 9.37 | 87.3 |
| Cmp5 | FePt/35AlN | 0.50 | FePt/45AlN | 4.0 | 7 | No data due to non-use of B | Analysis impossible | 212.2 |
| Cmp6 | FePt/8C—6BN—20AlN | 0.50 | FePt/8C—6BN—20AlN | 4.0 | 7 | Peak analysis impossible due to small amount of B | 10.77 | 314.6 |
| Cmp7 | FePt/37BN | 0.19 | FePt/38BN | 4.0 | 7 | 190.2 | 7.75 | 656.6 |
| Cmp8 | FePt/37BN | 0.37 | FePt/38BN | 4.0 | 7 | 190.2 | 7.69 | 642.9 |
| Cmp9 | FePt/37BN | 0.56 | FePt/38BN | 4.0 | 7 | 190.2 | 8.13 | 602.4 |
| Cmp10 | FePt/27C—2BN—5AlN | 0.50 | FePt/38BN | 4.0 | 7 | 190.7 | 8.27 | 683.1 |
| Cmp11 | FePt/40AlN | 0.50 | FePt/38BN | 4.0 | 7 | 190.6 | 7.41 | 637.7 |

As illustrated in Table 1, it was confirmed that the magnetic recording medium according to each of the exemplary implementations EI1 to EI11 has a peak position in the B1s spectrum of the second magnetic layer 30B observed by the XPS appearing at a binding energy of 191.6 eV or less, and a saturation magnetization Ms of 688.7 emu/cm$^3$ or more. In contrast, it was conformed that the magnetic recording medium according to each of the comparative examples Cmp1 to Cmp11 satisfies two or more of the following conditions which are (i) the peak position in the B1s spectrum of the second magnetic layer 30B observed by the XPS appears at a binding energy of 192 eV or more; (ii) the intergrain distance is 8.0 nm or greater; and the saturation magnetization Ms is less than 700 emu/cm$^3$.

Further, as illustrated in FIG. 4, the peak position in the B1s spectrum of the second magnetic layer 30B observed by the XPS in the exemplary implementation EI4 was in a vicinity of the binding energy of 191.0 eV, but as illustrated in FIG. 5, the peak position in the B1s spectrum of the second magnetic layer 30B observed by the XPS in comparative example Cmp7 was in a vicinity of the binding energy of 192.2 eV. Hence, it was confirmed that the magnetic grains included in the second magnetic layer 30B of the comparative example Cmp7 are in a more oxidized state.

Therefore, it was confirmed that when the chemical state of the boron nitride (BN) in the grain boundary portion of the second magnetic layer is satisfactory, the grain diameter of the magnetic grains included in the second magnetic layer is small, and the saturation magnetization Ms of the magnetic recording medium can be increased. Hence, the magnetic recording medium according to each of the exemplary implementations EI1 to EI11 has a high surface recording density, and thus, by using the magnetic recording medium in the magnetic storage apparatus, the magnetic storage apparatus can have a high recording capacity.

Accordingly to the present disclosure, it is possible to provide a magnetic recording medium in which diffusion of oxygen atoms into a magnetic layer is prevented, to reduce a grain size of magnetic grains included in the magnetic recording layer, increase a saturation magnetization, and further improve a surface recording density of the magnetic recording medium.

Although the exemplary implementations are designated by, for example, "EI1", "EI2", . . . , and "EI11", the ordinal numbers affixed to "EI" do not imply priorities of the exemplary implementations. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A magnetic recording medium comprising:
    a nonmagnetic substrate;
    an underlayer including at least one NaCl type compound that is MgO, TiO or NiO and disposed above the nonmagnetic substrate; and
    a magnetic recording layer disposed on the underlayer, wherein
    the magnetic recording layer includes a first magnetic layer disposed on and in contact with the underlayer, and a second magnetic layer disposed above the first magnetic layer,
    each of the first magnetic layer and the second magnetic layer has a granular structure including magnetic grains having a L1$_0$ structure and a grain boundary portion,
    the grain boundary portion of the first magnetic layer includes aluminum nitride,
    the grain boundary portion of the second magnetic layer includes hexagonal boron nitride,
    an absolute value of a Gibbs free energy of oxidation reaction for aluminum included in the grain boundary portion of the first magnetic layer is larger than that for an element, other than aluminum, included in the first magnetic layer and the second magnetic layer,
    the second magnetic layer has an intergrain distance that is less than 8.0 nm, an aluminum nitride content in the first magnetic layer is in a range of 15 vol % to 35 vol %, a peak in a B1s spectrum of the grain boundary portion of the second magnetic layer observed using X-ray photoelectron spectroscopy is 191.6 eV or less, the magnetic recording medium has a saturation magnetization that is 688.7 emu/cm$^3$ or more, and the element included in the first magnetic layer and the second magnetic layer is B, Fe or Pt, such that the aluminum included in the grain boundary portion of the first magnetic layer is more easily oxidized than the element included in the first magnetic layer and the second magnetic layer and the aluminum reacts with oxygen that diffuses from the nonmagnetic substrate or the underlayer to prevent the oxygen from diffusing into the second magnetic layer.

2. The magnetic recording medium as claimed in claim 1, wherein the first magnetic layer has a thickness in a range of 0.25 nm to 0.7 nm.

3. The magnetic recording medium as claimed in claim 1, wherein the second magnetic layer has a thickness in a range of 5 nm to 12 nm.

4. The magnetic recording medium as claimed in claim 1, wherein the magnetic grains having the $L1_0$ structure are FePt alloy grains.

5. The magnetic recording medium as claimed in claim 2, wherein the second magnetic layer has a thickness in a range of 5 nm to 12 nm.

6. The magnetic recording medium as claimed in claim 2, wherein the magnetic grains having the $L1_0$ structure are FePt alloy grains.

7. A magnetic storage apparatus comprising:
the magnetic recording medium according to claim 1; and
a head configured to record information on and reproduce information from the magnetic recording medium.

8. A magnetic storage apparatus comprising:
the magnetic recording medium according to claim 2; and
a head configured to record information on and reproduce information from the magnetic recording medium.

9. The magnetic recording medium as claimed in claim 1, wherein the grain boundary portion of the first magnetic layer includes $SiO_2$ in addition to the aluminum nitride.

* * * * *